United States Patent [19]
Deville et al.

[11] Patent Number: 5,916,536
[45] Date of Patent: Jun. 29, 1999

[54] PRODUCTION OF CALCINED ALUMINA WITH A CRYSTALLITE SIZE WHICH CAN BE REGULATED WITH A NARROW DISPERSION

[75] Inventors: Jean Deville, Aix-en-Provence; Jean-Michel Lamerant, Bouc Bel Air, both of France

[73] Assignee: Aluminium Pechiney, Courbevoie, France

[21] Appl. No.: 08/961,041

[22] Filed: Oct. 30, 1997

[30] Foreign Application Priority Data

Nov. 4, 1996 [FR] France .................................. 96 13622

[51] Int. Cl.⁶ ...................................................... C01F 7/02
[52] U.S. Cl. .......................... 423/625; 423/626; 501/127
[58] Field of Search ................................. 423/600, 625, 423/626; 501/127

[56] References Cited

U.S. PATENT DOCUMENTS

| | | | |
|---|---|---|---|
| 3,859,427 | 1/1975 | Francis et al. ........................... | 423/600 |
| 3,961,036 | 6/1976 | Hamner et al. .......................... | 423/628 |
| 4,308,088 | 12/1981 | Cherdron et al. ....................... | 423/625 |
| 5,538,709 | 7/1996 | Mohri et al. ............................ | 423/625 |

FOREIGN PATENT DOCUMENTS

| | | |
|---|---|---|
| 0 105 025 A1 | 4/1984 | European Pat. Off. . |
| 0 281 265 A1 | 7/1988 | European Pat. Off. . |
| 0 558 794 A1 | 8/1993 | European Pat. Off. . |
| 0 680 929 | 8/1995 | European Pat. Off. . |
| 521 124 | 5/1931 | Germany . |

*Primary Examiner*—Paul Marcantoni
*Attorney, Agent, or Firm*—Pollock, Vande Sande & Amernick

[57] ABSTRACT

The invention concerns a process for the production of alumina for ceramics by calcining alumina trihydrate in the presence of a mineralizer such as a halogenated compound and/or a boron compound, the calcined alumina being constituted by friable agglomerates of elementary particles, or crystallites, of alpha alumina, the average size of which can be fixed as required, with a unimodal narrow distribution of crystallite sizes, characterized in that calcining of the alumina trihydrate is carried out in an industrial kiln in a renewed oxidising atmosphere at a temperature in the range 800° C. to 1300° C. for a period of 0.5 hour to 4 hours in the simultaneous presence of a halogenated compound acting as a mineralizer and a silica based alumina recrystallisation modifier which is uniformly and intimately distributed in the alumina trihydrate charge.

17 Claims, 1 Drawing Sheet

Figure I
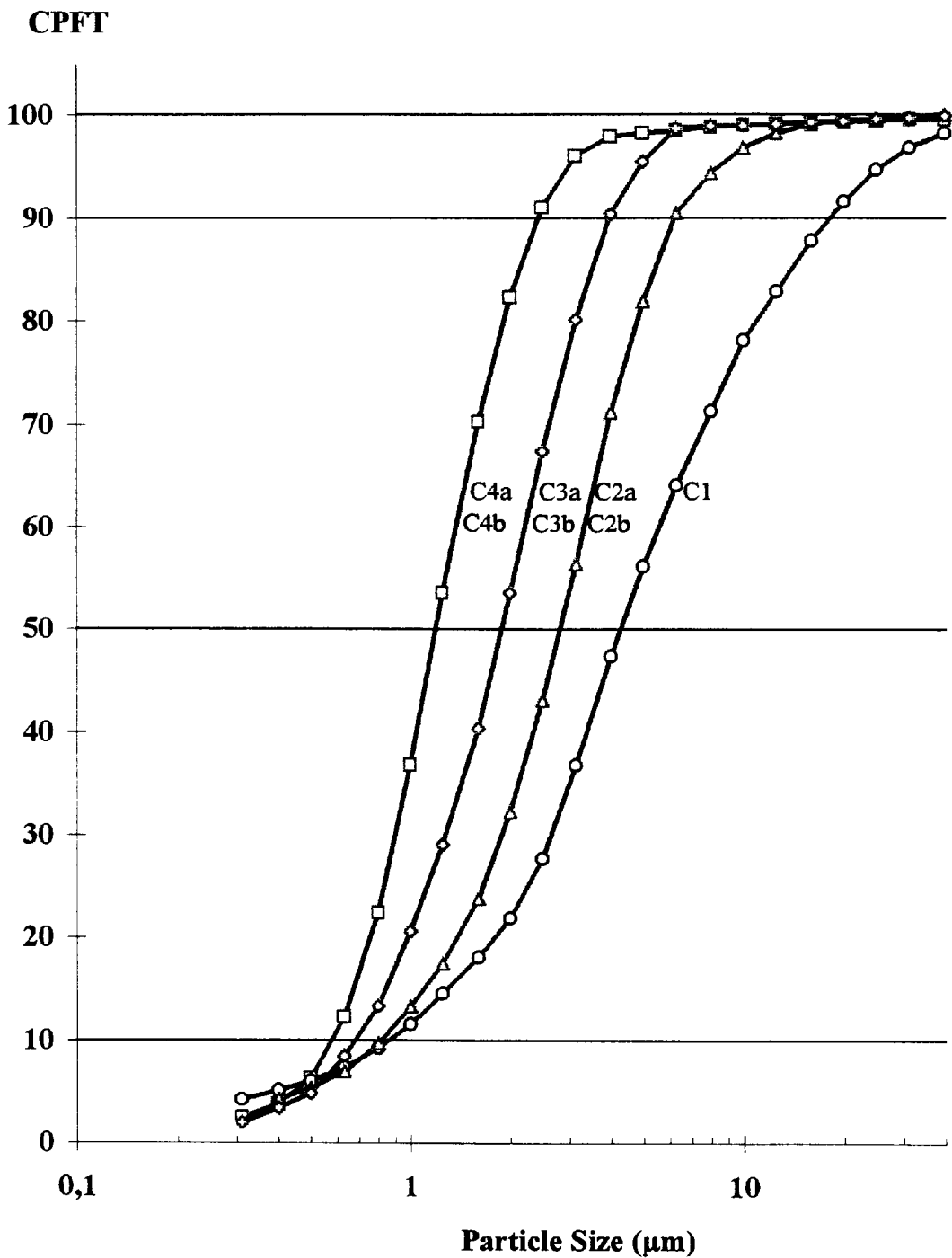

PRODUCTION OF CALCINED ALUMINA WITH A CRYSTALLITE SIZE WHICH CAN BE REGULATED WITH A NARROW DISPERSION

FIELD OF THE INVENTION

The invention concerns a process for the production of calcined alumina for ceramic materials such as grinding media, the calcined alumina being principally constituted by friable agglomerates of elementary particles, or crystallites, of alpha alumina with an average size of between 0.5 to 4 micrometers with a very narrow dispersion about that average size.

PRIOR ART

Calcined aluminas are distinguished by the diversity of their applications resulting in a wide variety of properties, linked mainly to their purity, to their degree of transformation to alpha alumina, or degree of alphanisation, which itself is a function of the degree of calcining, the size and the morphology of alpha alumina crystallites assembled in agglomerates of greater or lesser friability.

Among calcined aluminas, those principally constituted by alpha alumina are known for their refractory properties, for hardness, and for their thermal and electrical insulation properties and their main applications are in the fields of abrasives, grinding substances, refractory materials, glasses, and mechanical and electrical ceramics. The need for constant improvement in the performances of commercial products and thus the quality of materials such as the alumina used in their production has led users of calcined alumina, for example, to increase their demands as regards grain size, in particular as regards the dimensions and homogeneity of alumina crystallite size. Such characteristics determine the ability of the calcined alumina to sinter and as a result, determine the properties of the sintered material, in particular its density and hardness. In this regard calcined alumina powder principally constituted by friable agglomerates of alpha alumina crystallites with an average size which is in the range 0.5 $\mu$m to 4 $\mu$m, preferably centred on 2 $\mu$m with a very narrow unimodal distribution of these crystallite sizes, is used a great deal for the production of grinding media.

Even if, a priori, preparation processes using mixtures of fine and coarser alumina powder must be excluded because of the heterogeneity of the texture of the grains resulting in different degrees of calcining and a wide dispersion of crystallite sizes, the skilled person can make use of a number of processes for producing such a calcined alumina powder. However, none of these simultaneously satisfies the criteria of quality, reproducibility and low production costs, which are deciding factors when several thousands of tonnes/year of this quality of alumina have to be produced.

U.S. Pat. No. 1,366,016 (Reynolds) describes a process for the production of alpha alumina with a low sodium content by calcining an alumina hydrate or an alumina which has already been calcined, originating from the Bayer process, in the presence of at least 1%, preferably 3% to 10% by weight, of silica powder with a grain size of over 44 pm. At a calcining temperature in the range 1260° C. to 1540° C., a degree of alphanisation of more than 90% is obtained in which the size of a majority of elementary particles or crystallites is less than 2 $\mu$m. At the same time in this temperature range, the residual sodium content in the calcined alumina is very significantly reduced following the formation of sodium silicate which is eliminated by sieving along with the excess uncombined silica.

That process, which is mainly intended to reduce the sodium content in aluminas from calcining alumina trihydrate originating from the Bayer process, suffers high operating costs because of the necessity to provide a high throughput of siliceous additive, to carry out continuous expensive analyses to monitor crystallite size and pollution of the alumina by sodium and silicon, and lastly to carry out a final sieving step for the entire product to limit pollution by residual silica and the sodium silicate formed. Such a process is of importance for the production of fine alumina powder where the sodium content has to be reduced to less than 500 ppm for certain applications.

Other processes recommend the addition, when calcining alumina hydrate obtained from the Bayer process, of a mineralizer based on alkaline halides and/or borides, which encourage recrystallisation of the alumina to alpha alumina and thus reduce the alphanisation onset temperature. Thus in U.S. Pat. No. 4,487,756 (Alusuisse), calcining between 1200° C. and 1400° C. can produce alpha alumina in which 80% of the crystallites are of a size which is in the range 1 $\mu$m to 10 $\mu$m, which in the present case is still insufficient as regards homogeneity of crystallite size. Such a dispersion, which is too wide, is linked to the difficulty of stabilising the average crystallite diameter at a predetermined value, rendering this type of process less reliable at least as regards grain size range when the average diameter is intended to be 0.5 $\mu$m to 4 $\mu$m.

In order to encourage the formation of monodispersed microcrystals of alpha alumina, U.S. Pat. No. 4,847,064 (Alcoa) introduces an alpha alumina based promoter, which is mixed with the seed intended to precipitate alumina trihydrate, into the Bayer liquor process decomposition stage. After drying, the precipitated alumina trihydrate is calcined in the presence of a mineralizer as described above. The alpha alumina promoter reduces the alphanisation temperature to less than 1200° C. while the average alpha alumina crystallite size is still below 3 $\mu$m.

That process can thus produce the desired crystallite size but a twofold constraint is placed on the manufacturer:

The need to go far upstream in the process to adjust the Bayer liquor decomposition conditions, which implies a completely integrated manufacturing process from treating the bauxite to calcining the alumina hydrate; The need for perfect control of the Bayer liquor decomposition conditions in the presence of an alpha alumina promoter for which the physico-chemical characteristics must be completely stabilised. Very small fluctuations can substantially modify the characteristics of the precipitated hydrate, and those of the calcined alumina, with a greater risk of crystallite size dispersion, rendering the process difficult to master on an industrial scale.

Finally, the process for the production of monodispersable alumina described in European patent EP-B-0 281 265 (Sumitomo) uses, when calcining the alumina hydrate, a mineralizer based on chlorine, an alkaline-earth chloride or sodium fluoride, possibly combined with a powdered siliceous substance when the alumina hydrate has a very high sodium content. Nevertheless, that process cannot produce an alumina having, for a set average crystallite size (in the range 1 $\mu$m to 3 $\mu$m in the different examples cited), the crystallite size distribution required for the majority of ceramics applications, simply by controlling the temperature and calcination period.

In order to reduce this dispersion, EP-B-0 281 265 recommends, prior to calcining the alumina hydrate, a specific deagglomeration treatment which is claimed as consisting of.

mechanical pulverisation of the agglomerated alumina hydrate particles;

forming an aqueous suspension of the pulverised hydrate;

adjusting the viscosity of the suspension to obtain a thermally decomposable, non polluting additive;

spray drying the suspension to obtain a powder which can then be calcined.

After calcining, while the homogeneity of the crystallite sizes is very substantially improved, the extra cost of such an operation is considerable on an industrial scale. A simplified version of this process is described in EP-B-0 277 730 (Sumitomo) which excludes initial mechanical pulverisation of the agglomerate alumina hydrate particles to carry out only one spray drying operation, but the result is less convincing.

EP-A-0 680 929 (SUMITOMO CHEMICAL CO) discloses a process for the production of alpha alumina, used as a basic material for abrasives or sintered parts, from a starting material of any origin, possibly a alumina hydrate from the BAYER process.

That starting material must first undergo a granulation step in order to increase its apparent bulk density, the particles obtained then being calcined in an atmosphere containing at least 0.1% by volume of a halogen gas or a hydrogen halide, the gas being possibly generated during calcination by a solid or liquid halogenated compound. The starting material is optionally mixed with a shape regulating agent in a proportion which is in the range $10^{-5}$ to $5 \cdot 10^{-1}$ by weight, preferably $10^{-5}$ to $10^{-1}$. The agent is selected from a long list of simple metals from the alkalis, alkaline-earths, rare earths and transition metals, also silicon and boron. It may also be formed by compounds such as the oxides, nitrides, oxynitrides, carbides, carbonitrides, halides, borides, etc. of these "metals". In the document, the addition of silicon or its oxide can increase the D/H ratio, D being the maximum size of a particle with a hexagonal close packed structure in a direction parallel to the hexagonal lattice plane and H being a particle size in a direction perpendicular to the hexagonal lattice plane. The aim of that process is to obtain an alumina with good packing property whatever the nature of the starting material.

Thus, because there is a gap in the prior art, the skilled person does not have a reliable and cheap industrial process available for the production of calcined alumina for ceramic applications for which the average crystallite size can be fixed as required at between 0.5 micrometers and 4 micrometers, with a narrow dispersion of crystallite sizes about the selected central value.

SUMMARY OF THE INVENTION

The process of the invention provides a solution to this problem. It is founded on the surprising fact that, by combining appropriate proportions by weight of a mineralizer with a siliceous additive which is uniformly and finely dispersed in the alumina hydrate charge at the start of the calcining step, an alumina with the required grain size characteristics can be reliably obtained under normal industrial calcining conditions.

More precisely, the invention concerns a process for the production of alumina for ceramics by calcining alumina trihydrate in the presence of a mineralizer such as a halogenated compound and/or a boron compound, the calcined alumina being constituted by friable agglomerates of elementary particles, or crystallites, of alpha alumina with an average size which is fixed as required with a unimodal narrow distribution of crystallite sizes, characterized in that calcining the alumina trihydrate charge, $Al2O3 \cdot 3H2O$ is carried out in an industrial kiln at a temperature in the range 800° C. to 1300° C. for a period of ½ hour to 4 hours in the simultaneous presence of a halogenated compound acting as a mineralizer and an alumina recrystallisation modifier based on silica which is uniformly and intimately distributed in the alumina trihydrate charge in a proportion of 300 to 5000 g of $SiO2$ per tonne of alumina expressed as $Al2O3$ (i.e., 0.03% to 0.5%).

The halogenated compound acting as a mineralizer is preferably a fluorinated compound selected from the group formed by fluorine, hydrofluoric acid, aluminium trifluoride, and alkaline fluorides. In its gaseous form, it can be introduced and mixed in the atmosphere of the kiln. It can also, preferably, be dispersed in the alumina trihydrate charge as a gas, aqueous solution or solid. The amount of mineralizer added is such that the alumina leaving the kiln contains 20 g to 80 g of fluorine per tonne of $Al2O3$. Introducing the mineralizer generates a slightly fluorinated atmosphere in the kiln, the proportion of halogenated gas being in the range 0.01% to 0.09% by volume.

The industrial kiln is a calcining kiln, preferably with a renewed oxidising atmosphere. It may be a gas heated rotary kiln.

The silica based modifier introduced into the alumina trihydrate charge from an external supply is preferably dispersed in the charge in the form of a liquid or in the form of an aqueous suspension of silica particles or a siliceous compound generating silica on calcining. Below 300 g per tonne of alumina, the effect of the modifier is not particularly noticeable, probably because the number of nuclei supplied by the silica is insufficient. Above 5000 g per tonne of alumina, clumps have been observed to form, rendering the powder unsuitable for its end use. Preferably, a proportion in the range 400 g to 1500 g Of $SiO2$ per tonne of alumina is used. Preferably again, the silica is introduced in the form of micronic particles and the mixture must be intimate so as to obtain a uniform distribution of these particles.

We have solved the problem of low cost industrial production of calcined alumina powder intended, in particular after sintering, for the production of grinding, media and substances. In this type of application, the production of a homogeneous sintered material with the highest possible density (d>3.60) is essential for the production of sufficient hardness and abrasion resistance.

It was shown during the many tests which were carried out, that the presence of a mineralizer in the alumina trihydrate, intended to reduce the temperature of alphanisation onset to about 1000° C., and thus to reduce to the calcining temperature, was completely compatible with the presence of a siliceous compound which no longer acted in its known function as a sodium reducing agent at more than 1300° C. but had a new function as a recrystallisation modifier and thus a growth modifier for alpha alumina crystallites, formed from 1000° C. in the presence of the mineralizer. This stabilising function for the crystallite sizes is only effective, however, if the silica based recrystallisation modifier is uniformly distributed on the surface of alumina hydrate grains in the form of a fine aqueous suspension of very fine silica particles (about 1 $\mu$m) and not directly in the form of coarse silica grains. This results in a maximum surface area for exchange with alumina grains forming during calcining which recrystallise superficially.

Thus controlled addition of silica over a calcining temperature range preferably in the range 900° C. to 1200° C.

for periods which are preferably in the range 1 hour to 3 hours enables the average size of the alumina crystallites to be fixed at between 0.5 µm and 4 µm with a very narrow dispersion about the selected central value. In this respect, it should be pointed out that the average crystallite size is normally determined by the average diameter D50 corresponding to the weight percentage of fines cumulated to 50% deduced from the measured grain size distribution curve, after deagglomeration of the product by laser diffraction (in accordance with French standard NF 11-666), by photosedimentation (in accordance with French standard NFX 11-682) or by X ray absorption (in accordance with French standard NFX 11-683). Regarding the degree of dispersion of the crystallite sizes about the average size, or D50, it is determined by the ratio of diameters D90/D10 corresponding respectively to the weight percentage of fines cumulated to 90% and 10% also deduced from the grain size distribution curve mentioned above.

In the present case the D90/D10 ratio must be less than 6 and preferably must not exceed 4. It is clear that such a small degree of dispersion excludes any preparation method which relies on a mixture of two or more calcined alumina powders having different populations of crystallite sizes for which the D90/D10 ratio is more than 15.

As will be clear from the prior art, the problem of crystallite size homogeneity even occurs for alumina powders having a single population of crystallite sizes (unimodal distribution) since the calcining operation itself is an important heterogeneity factor in particular on the industrial scale with high throughput kilns such as rotary kilns which can calcine 15 to 20 t/hour of alumina trihydrate. The whole mass of product moving in the rotating drum (3 to 5 meters in diameter and 60 to 100 meters long) does not rigorously undergo the same thermal cycle, primarily due to a radial thermal gradient which cannot be completely compensated for by circulating hot air in the kiln axis. For this reason, prior deagglomeration of grains of alumina trihydrate before calcining (in accordance with EP-B-0 281 265), which is effective if subsequent calcining of the alumina trihydrate is carried out in a thin layer, for example in a box in a static kiln or a through-type kiln, becomes far less of a determining factor for monodispersion of the alumina crystallite sizes if calcining is carried out in an industrial rotary kiln.

The importance of the process of the invention lies in the fact that by adding silica to the alumina trihydrate charge under the conditions defined above and without substantial modifications being made to the normal calcining conditions in an industrial kiln (temperature, alumina trihydrate supply rate, amount of mineralizer, air flow rate . . . ), it is possible to limit the effects of factors influencing grain size heterogeneity such as temperature gradients and the concentration of mineralizer in the alumina trihydrate charge by moderating or even rendering uniform the superficial crystallisation rate of crystallites and as a result, their growth rate. This stabilising action leads to improved precision in fixing crystallite sizes to a predetermined diameter in the range 0.5 µm to 4 µm, with a narrow dispersion of crystallite sizes.

It should also be noted that the basic material for carrying out the invention is preferably metallurgical quality alumina trihydrate for the production of aluminium by electrolysis as it is readily commercially available in large quantities. This alumina trihydrate, constituted by agglomerates of grains with a size which varies from 10 µm to 150 µm (D50 of the order of 80 µm) is obtained by decomposition of a supersaturated solution of sodium aluminate in the presence of an alumina trihydrate seed using the Bayer process and containing, as residual impurities, 0.2% to 0.5% of soda expressed as Na2O, also 50 to 200 ppm of silica uniformly distributed in the alumina trihydrate but which must be taken into account with the externally supplied silica to determine the total quantity of modifier in the form of SiO2 present in the alumina trihydrate charge.

The externally supplied recrystallisation modifier is preferably dispersed by spraying into the charge either a liquid: a siliceous compound (siloxane) dissolved in an organic solvent, fluorosilicic acid H2SiF6, or alkaline silicates or alkaline fluorosilicates in aqueous solution, or an aqueous suspension of micronic particles of silica, alkaline-earth silicates or alkaline-earth fluorosilicates.

The modifier is introduced into the moist alumina trihydrate charge before drying or into the alumina trihydrate which has been dried at less than 200° C., i.e., at the inlet to the calcining kiln, or into the partially dehydrated alumina charge, i.e., between 200° C. and 400° C. in the pre-calcining zone.

The process of the invention will be better understood from its detailed description.

PREFERRED EMBODIMENTS OF THE INVENTION

Industrial tests for the production of calcined alumina powder with an average crystallite size which could be fixed at between 0.5 µm and 4 µm with a narrow dispersion of crystallite sizes defined by a D90/D10 ratio of less than 6, preferably less than 4, were carried out in a gas heated rotary kiln with a total length of 80 meters and a cylinder diameter of 4 meters.

Principal operating conditions a) Parameters which were kept constant for the whole duration of the tests corresponding to standard alumina trihydrate calcining conditions in the absence of a silica based modifier:

Feed:

moist alumina trihydrate (moisture content 5%);

average sodium content, expressed as Na2O/Al2O3: 0.24%;

residual silica content, expressed as SiO2/Al2O3=80 ppm;

kiln supply rate: 18 tonnes/hour expressed as moist Al2O3 3H2O;

AlF3 mineralizer as a solid added to moist Al2O3 3H2O in a proportion of 600 g of AlF3 per hour, i.e., 37 g of F/tonne Al2O3;

gas flow rate (air+combustion gas)=1330±20 m3;

temperature of calcining zone: 900° C. to 1100° C.

Average residence time of product in calcining zone: 2 hours.

b) Variable parameter:

The silica based modifier constituted in the present case by an aqueous suspension of micronic silica particles (silica gel, reference TX3S, from Rhône-Poulenc) was sprayed into moist Al2O3 3H2O at the inlet to the kiln under normal operating conditions (no addition of modifier from external supply) in 3 hourly flow rates:

24 l/hour, from time t=0 to t=12 hours, corresponding to an amount of SiO2 added to the alumina Al2O3 charge of 400 ppm which must be added to the residual silica content (80 ppm) of alumina trihydrate, i.e., a total of 480 ppm of SiO2 (0.048%);

36 l/hour, from t=12 hours to t=24 hours, corresponding to an amount of SiO2 added to the alumina Al2O3 charge of 600 ppm which must be added to the residual silica content of alumina trihydrate, i.e., a total of 680 ppm of SiO2 (0.068%);

48 l/hour, from t=24 hours to t=36 hours, corresponding to an amount of SiO2 added to the alumina Al2O3 charge of 800 ppm which must be added to the residual silica content of alumina trihydrate, i.e., a total of 880 ppm of SiO2 (0.088%);

c) Results:

Average results of analyses carried out on samples of alumina removed every 2 hours from the kiln outlet are shown in Table 1 below and in FIG. 1 for CPFT (cumulative percent finer than) graphs C1, C2a, C2b, C3a, C3b, C4a and C4b of the particle size distribution measured using a Sedigraph 5100 Micromeritics apparatus (in accordance with French standard NFX 11-683).

It should be noted that, while not representative of the degree of dispersion of the crystallite sizes, measurements of the BET specific surface area (in accordance with French standard NF 12-621) were systematically carried out on each sample of alumina powder which was taken, as in common with the diameter D50 deduced from the crystallite size distribution curve, they give a good indication of the evolution of the average degree of fineness of the calcined alumina powder average crystallite size as a function of the operating conditions.

TABLE I

| T/hr | Silica gel flow l/h | SiO2 ppm | BET m2/g | Na2O ppm | D50 µm | D90 µm | D10 µm | D90/D10 | Graph. curve ref |
|---|---|---|---|---|---|---|---|---|---|
| 0 | 24 | 80 | 0.61 | 2400 | 4.6 | 12 | 0.9 | 13 | C1 |
| 2 | 24 | 80 | 0.65 | 2350 | | | | | |
| 4 | 24 | 320 | 0.77 | 2350 | 3.3 | 5.8 | 0.85 | 7 | |
| 6 | 24 | 435 | 0.82 | 2250 | | | | | |
| 8 | 24 | 490 | 0.85 | 2300 | 2.8 | 4.1 | 0.80 | 5 | C2a |
| 12 | 24 | 490 | 0.83 | 2400 | 2.9 | 3.9 | 0.80 | 5 | C2b |
| 14 | 36 | 570 | 0.86 | 2450 | | | | | |
| 16 | 36 | 570 | 0.91 | 2400 | 2.2 | 3.3 | 0.75 | 4.5 | |
| 18 | 36 | 645 | 0.95 | 2450 | | | | | |
| 20 | 36 | 725 | 0.98 | 2350 | 1.8 | 2.8 | 0.7 | 4 | C3a |
| 22 | 36 | 690 | 0.94 | 2250 | | | | | |
| 24 | 36 | 680 | 0.97 | 2250 | 1.9 | 2.8 | 0.7 | 4 | C3b |
| 26 | 48 | 710 | 0.98 | 2300 | | | | | |
| 28 | 48 | 790 | 1.05 | 2350 | 1.6 | 2.3 | 0.65 | 3.5 | |
| 30 | 48 | 840 | 1.15 | 2450 | | | | | |
| 32 | 48 | 910 | 1.20 | 2400 | 1.1 | 1.9 | 0.6 | 3 | C4a |
| 34 | 48 | 890 | 1.16 | 2300 | | | | | |
| 36 | 48 | 870 | 1.15 | 2350 | 1.2 | 1.9 | 0.6 | 3 | C4b | d) Observations:

It can be seen that under prior art calcining conditions (i.e., in the absence of a modifier), the average crystallite size of calcined alumina sampled from the kiln outlet at time t=0 where the modifier had only begun to be introduced into the other end of the kiln, was 4.6 µm, thus too high, with a grain size distribution D90/D10~3 (see curve Cl), i.e., too high. The presence of only 80 ppm of residual silica in the alumina trihydrate charge was insufficient to slow down the growth of the alumina crystallites.

With an external supply of modifier in a proportion of 400 ppm of SiO2 with respect to the Al2O3 (rate of 24 l/h) and thus a total silica content centred on 480 ppm the residual silica into account), but which could vary from 400 to 500 ppm, after a transient period of about 6 hours corresponding to the average total residence time of the product in the kiln had passed, it was possible to obtain an average crystallite size D50 centred on 2.9/3 µm with a D90/D10 ratio of the order of 5 which was thus in agreement with one of the desired qualities of the calcined alumina (see curves C2a and C2b).

Similarly, by fixing the external supply of modifier to an amount of 600 ppm of SiO2, with respect to Al2O3 (rate of 36 l/h) and thus a total silica content, including the residual silica, centred on 680 ppm but which could vary from 550 to 700 ppm, an average crystallite size D50 centred on 1.8/2 µm with a D90/D10 ratio of the order of 4 was obtained which was thus in agreement with the second desired quality of the calcined alumina (see curves C3a and C3b). It should be noted that hardness and wear tests carried out on sintered parts with a density in the range 3.60 to 3.65 for the production of grinding media formed from this quality of powder were completely satisfactory.

Finally, by fixing the external supply of modifier to an amount of 800 ppm of SiO2 with respect to Al2O3 (rate of 48 l/h) and thus a total silica content, including the residual silica, centred on 880 ppm but which could vary from 750 to 1000 ppm, an average crystallite size D50 centred on 1/1.2 µm with a D90/D10 ratio of the order of 3 was obtained which was thus in agreement with a third desired quality of the calcined alumina (see curves C4a and C4b).

Finally, it should be noted that whatever the grain size of the calcined alumina powder obtained, the residual sodium content, expressed as Na2O/Al2O3, remained equivalent to that of the initial alumina trihydrate and systematically in the range 0.2% to 0.5%.

ADVANTAGES OF THE PROCESS OF THE INVENTION

In addition to its great flexibility on an industrial scale, the process of the invention has been shown to be reliable, easy to carry out as it can be directly adapted to standard production conditions, and because of this it has low operational costs.

Its application is not limited to calcining operations where only the quantity of modifier is adjusted to adjust the grain size of the calcined alumina. Clearly, it is also applicable in combination with other parameters for regulating crystallite size, such as calcining temperature and the amount of mineralizers if, for example, the silica content of the calcined alumina powder is unacceptable for some applications beyond a certain threshold.

We claim:

1. A process for the production of alumina for ceramics by calcining alumina trihydrate in the presence of a mineralizer and silica, wherein said alumina trihydrate results from the decomposition of a Bayer pregnant aluminate liquor and wherein silica, used as alumina recrystallization modifier, is uniformly and intimately distributed in an alumina trihydrate load in a proportion by weight of 300 g to 5000 g of SiO2 per ton of alumina, expressed as Al2O3.

2. The process according to claim 1, wherein the mineralizer is a fluorinated compound selected from the group consisting of fluorine, hydrofluoric acid, aluminum trifluoride, and alkaline fluorides.

3. The process according to claim 1, wherein the fluorinated compound is introduced into the alumina trihydrate as a gas, aqueous solution or solid.

4. The process according to claim 2, wherein the fluorinated compound is introduced into the alumina trihydrate load in a proportion by weight such that the alumina at the kiln outlet contains 20 g to 80 g of fluorine per ton of Al2O3.

5. The process according to claim 2, wherein the fluorinated compound generates a halogenated atmosphere in the calcining kiln, the halogenated gas being present in a proportion of less than 0.09% by volume in said atmosphere.

6. The process according to claim 1, including introducing silica into the alumina trihydrate load from an external supply and dispersing said silica in liquid form or in the form of an aqueous suspension of silica particles or a siliceous compound generating silica on calcining.

7. The process according to claim 1, wherein silica is introduced into the load in the form of micrometric particles.

8. The process according to claim 1, wherein silica is introduced into the load in a proportion by weight of 400 g to 1500 g of SiO2 per ton of alumina Al2O3.

9. The process according to claim 1, wherein the calcining temperature is in the range 900° C. to 1200° C.

10. The process according to claim 1, wherein the calcining period is in the range 1 hour to 3 hours.

11. The process according to claim 1, wherein metallurgical quality alumina trihydrate is used as a load and originates from the Bayer process containing 0.2% to 0.5% of caustic soda, expressed as Na2O/Al2O3, and 50 to 200 ppm of SiO2/Al2O3.

12. The process according to claim 11, including the step of introducing silica into the moist alumina trihydrate load before drying.

13. The process according to claim 11, including the step of introducing silica into the dried alumina trihydrate load at less than 200° C., at the calcining kiln inlet.

14. The process according to claim 11, wherein silica is introduced into the partially dehydrated load into the pre-calcining zone of the kiln, at a temperature of between 200° C. and 400° C.

15. A calcined alumina powder according to claim 1 having an average crystallite diameter D50 centered on 2.9 $\mu$m to 3 $\mu$m with a D90/D10 ratio of the order of 5, a silica content in a range of 400 to 500 ppm and a sodium content, expressed as Na2O, in a range of 0.2% to 0.5%.

16. A calcined alumina powder according to claim 11, having an average crystallite diameter D50 centered on 1.8 $\mu$m to 2 $\mu$m with a D90/D10 ratio of the order of 4, a silica content in a range of 550 to 700 ppm and a sodium content, expressed as Na2O, in a range of 0.2% to 0.5%.

17. A calcined alumina powder according to claim 1, having an average crystallite diameter D50 centered on 1 $\mu$m to 1.2 $\mu$m with a D90/D10 ratio of the order of 3, a silica content in a range of 750 to 1000 ppm and a sodium content, expressed as Na2O, in a range of 0.2% to 0.5%.

* * * * *